United States Patent
Liu et al.

(10) Patent No.: US 8,262,779 B2
(45) Date of Patent: Sep. 11, 2012

(54) MICROPOROUS ALUMINOPHOSPHATE MOLECULAR SIEVE MEMBRANES FOR HIGHLY SELECTIVE SEPARATIONS

(75) Inventors: Chunqing Liu, Schaumburg, IL (US); Stephen T. Wilson, Libertyville, IL (US); David A. Lesch, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 242 days.

(21) Appl. No.: 12/857,308

(22) Filed: Aug. 16, 2010

(65) Prior Publication Data

US 2010/0311565 A1    Dec. 9, 2010

Related U.S. Application Data

(63) Continuation-in-part of application No. 11/934,200, filed on Nov. 2, 2007, now abandoned.

(51) Int. Cl.
*B01D 53/22* (2006.01)
*B01D 71/02* (2006.01)

(52) U.S. Cl. ........... 96/11; 96/4; 96/8; 95/45; 95/51; 95/54; 95/55; 210/640; 210/506; 502/4; 427/372.2; 55/DIG. 5

(58) Field of Classification Search ............ 96/4, 7, 96/8, 10, 11; 95/45, 47, 50, 51, 52, 54, 55; 210/640, 650, 500.23, 502.1, 506; 502/4, 502/60, 62, 64, 208; 55/523, 524, DIG. 5; 427/372.2

See application file for complete search history.

(56) References Cited

U.S. PATENT DOCUMENTS

| 2005/0139065 A1* | 6/2005 | Miller et al. ............... 95/45 |
| 2005/0204916 A1* | 9/2005 | Falconer et al. .............. 95/51 |

\* cited by examiner

*Primary Examiner* — Jason M Greene
(74) *Attorney, Agent, or Firm* — Mark Goldberg

(57) ABSTRACT

The present invention discloses microporous aluminophosphate ($AlPO_4$) molecular sieve membranes and methods for making and using the same. The microporous $AlPO_4$ molecular sieve membranes, particularly small pore microporous AlPO-14 and AlPO-18 molecular sieve membranes, are prepared by three different methods, including in-situ crystallization of a layer of $AlPO_4$ molecular sieve crystals on a porous membrane support, coating a layer of polymer-bound $AlPO_4$ molecular sieve crystals on a porous membrane support, and a seeding method by in-situ crystallization of a continuous second layer of $AlPO_4$ molecular sieve crystals on a seed layer of $AlPO_4$ molecular sieve crystals supported on a porous membrane support. The microporous $AlPO_4$ molecular sieve membranes have superior thermal and chemical stability, good erosion resistance, high $CO_2$ plasticization resistance, and significantly improved selectivity over polymer membranes for gas and liquid separations, including carbon dioxide/methane ($CO_2/CH_4$), carbon dioxide/nitrogen ($CO_2/N_2$), and hydrogen/methane ($H_2/CH_4$) separations.

6 Claims, No Drawings

MICROPOROUS ALUMINOPHOSPHATE MOLECULAR SIEVE MEMBRANES FOR HIGHLY SELECTIVE SEPARATIONS

CROSS-REFERENCE TO RELATED APPLICATION

This application is a Continuation-In-Part of application Ser. No. 11/934,200 filed Nov. 2, 2007, now abandoned, the contents of which are hereby incorporated by reference in its entirety.

BACKGROUND OF THE INVENTION

This invention pertains to novel high selectivity microporous aluminophosphate ($AlPO_4$) molecular sieve membranes. More particularly, the invention pertains to methods of making and using these microporous $AlPO_4$ molecular sieve membranes.

Gas separation processes with membranes have undergone a major evolution since the introduction of the first membrane-based industrial hydrogen separation process about two decades ago. The design of new materials and efficient methods will further advance membrane gas separation processes within the next decade.

The gas transport properties of many glassy and rubbery polymers have been measured as part of the search for materials with high permeability and high selectivity for potential use as gas separation membranes. Unfortunately, an important limitation in the development of new membranes for gas separation applications is a well-known trade-off between permeability and selectivity of polymers. By comparing the data of hundreds of different polymers, Robeson demonstrated that selectivity and permeability seem to be inseparably linked to one another, in a relation where selectivity increases as permeability decreases and vice versa.

Despite concentrated efforts to tailor polymer structure to improve the separation properties of polymer membranes; current polymeric membrane materials have seemingly reached a limit in the trade-off between productivity and selectivity. For example, many polyimide and polyetherimide glassy polymers, such as Ultem® 1000 polyetherimide, made by GE Plastics, Pittsfield, Mass., have much higher intrinsic $CO_2/CH_4$ selectivities ($\alpha_{CO2/CH4}$) (~30 at 50° C. and 690 kPa (100 psig) pure gas tests) than that of cellulose acetate (~22), which are more attractive for practical gas separation applications. These polymers, however, do not have levels of permeability attractive for commercialization compared to current commercial cellulose acetate membrane products, in agreement with the trade-off relationship reported by Robeson. In addition, gas separation processes based on glassy polymer membranes frequently suffer from plasticization of the stiff polymer matrix by the sorbed penetrant molecules such as $CO_2$ or $C_3H_6$. Plasticization of the polymer represented by the membrane structure swelling and a significant increase in the permeabilities of all components in the feed occurs above the plasticization pressure when the feed gas mixture contains condensable gases and therefore decreases selectivity.

Inorganic microporous molecular sieve membranes such as zeolite membranes have the potential for separation of gases under conditions where polymeric membranes cannot be used by taking advantages of their superior thermal and chemical stability, good erosion resistance, and high plasticization resistance to condensable gases.

Microporous molecular sieves are inorganic microporous crystalline materials with pores of a well-defined size ranging from about 0.2 to 2 nm. Zeolites are a subclass of microporous molecular sieves based on an aluminosilicate composition. Non-zeolitic molecular sieves are based on other compositions such as aluminophosphates, silicoaluminophosphates, and silica. Molecular sieves of different chemical compositions can have the same or different framework structures. Representative examples of microporous molecular sieves are small-pore molecular sieves such as SAPO-34, Si-DDR, UZM-9, AlPO-14, AlPO-34, AlPO-17, SSZ-62, SSZ-13, AlPO-18, LTA, UZM-25, ERS-12, CDS-1, MCM-65, MCM-47, 4A, 5A, UZM-5, UZM-9, AlPO-34, SAPO-44, SAPO-47, SAPO-17, CVX-7, SAPO-35, SAPO-56, AlPO-52, SAPO-43, medium-pore molecular sieves such as silicalite-1, and large-pore molecular sieves such as NaX, NaY, and CaY. Membranes made from these microporous molecular sieve materials provide separation properties mainly based on molecular sieving and/or competitive adsorption mechanism. Separation with microporous molecular sieve membranes is mainly based on competitive adsorption when the pores of large- and medium-pore microporous molecular sieves are much larger than the molecules to be separated. Separation with microporous molecular sieve membranes is mainly based on molecular sieving or both molecular sieving and competitive adsorption when the pores are smaller or similar to one molecule but are larger than other molecules in a mixture to be separated.

A majority of inorganic microporous molecular sieve membranes supported on porous membrane support reported to date are made from MFI, LTA, FAU or MOR. LTA zeolites have pores in the range of 0.3-0.5 nm, and are able to distinguish small molecules such as $H_2$ and $N_2$. Guan et al. reported a $H_2/N_2$ ideal separation factor of 7.1 for a $Na^-$-type LTA zeolite membrane and improved the value to 7.5 by ion-exchange with $K^-$ (see Guan et al., SEPARATION SCIENCE AND TECHNOLOGY, 2001, 36, 2233). The pores of MFI zeolites are approximately 0.5-0.6 nm, and are larger than $CO_2$, $CH_4$, and $N_2$. Lovallo et al. obtained a selectivity of about 10 for $CO_2/CH_4$ separation using a high-silica MFI membrane at 393° K (see Lovallo et al., AICHE JOURNAL, 1998, 44, 1903). The pores of FAU zeolite are approximately 0.78 nm in size, and are larger than the molecular sizes of $H_2$ and $N_2$. High separation factors have been reported for $CO_2/N_2$ mixtures using FAU-type zeolite membranes. Permeation and adsorption experiments indicate that the high separation factors can be explained by competitive adsorption of $CO_2$ and $N_2$.

In recent years, some small-pore microporous molecular sieve membranes such as zeolite T (0.41 nm pore diameter), DDR (0.36×0.44 nm), and SAPO-34 (0.38 nm) have been prepared. These membranes possess pores that are similar in size to $CH_4$ but larger than $CO_2$ and have high $CO_2/CH_4$ selectivities due to a combination of differences in diffusivity and competitive adsorption. For example, a DDR type zeolite membrane has shown much higher $CO_2$ permeability and $CO_2/CH_4$ selectivity compared to polymer membranes. See Tomita et al., Microporous and Mesoporous Materials, 2004, 68, 71; Nakayama, US 2004/0173094. SAPO-34 molecular sieve membranes showed improved selectivity for separation of certain gas mixtures, including mixtures of $CO_2$ and $CH_4$. See Li et al., ADVANCED MATERIALS, 2006, 18, 2601; Falconer et al., US 2005/0204916.

There remains a need for improved molecular sieve membranes that provide improved selectivity for separations. Previous to the present invention, pure microporous aluminophosphate ($AlPO_4$) molecular sieve membranes such as AlPO-14 and AlPO-18 membranes have not been reported. The present invention discloses novel microporous aluminophosphate ($AlPO_4$) molecular sieve membranes and methods for making and using the same.

DETAILED DESCRIPTION OF THE INVENTION

The present invention discloses novel microporous aluminophosphate ($AlPO_4$) molecular sieve membranes and methods for making and using these molecular sieve membranes. The microporous $AlPO_4$ molecular sieve membranes, including small pore microporous AlPO-14 and AlPO-18 molecular sieve membranes, can be prepared by at least three different methods, including in-situ crystallization of one layer or multi layers of $AlPO_4$ molecular sieve crystals on a porous membrane support, coating a layer of polymer-bound $AlPO_4$ molecular sieve crystals on a porous membrane support, and a seeding method by in-situ crystallization of one continuous layer or multi layers of $AlPO_4$ molecular sieve crystals on a seed layer of $AlPO_4$ molecular sieve crystals supported on a porous membrane support.

The first method of preparation in accordance with this invention provides for making high selectivity microporous aluminophosphate ($AlPO_4$) molecular sieve membrane by in-situ crystallization of one layer or multi layers of $AlPO_4$ molecular sieve crystals on a porous membrane support comprising the steps of providing a porous membrane support having an average pore size of 0.1 µm or greater than 0.1 µm; synthesizing an aqueous $AlPO_4$-forming gel comprising an organic structure-directing template or a mixture of two or more organic structure-directing templates; aging the $AlPO_4$-forming gel to produce an aged $AlPO_4$-forming gel; contacting at least one surface of the porous membrane support with the aged $AlPO_4$-forming gel; heating the porous membrane support and the aged $AlPO_4$-forming gel to form a layer of $AlPO_4$ crystals on at least one surface of the porous membrane support or inside the pores of the porous membrane support to produce a template-containing $AlPO_4$ molecular sieve membrane; and calcining the resulting template-containing $AlPO_4$ molecular sieve membrane to remove the organic structure-directing template(s) and to form a layer of template-free microporous $AlPO_4$ molecular sieve crystals on the porous membrane support. In some cases to further improve selectivity but not change or damage the membrane, or cause the membrane to lose performance with time, multiple layers of template-free microporous $AlPO_4$ molecular sieve crystals are formed on the porous membrane support by contacting the template-containing $AlPO_4$ molecular sieve membrane with the aged $AlPO_4$-forming gel again followed by heating to form another layer of template-containing $AlPO_4$ membrane. This contacting and heating step may be repeated two or more times.

A second method for preparing high selectivity microporous aluminophosphate ($AlPO_4$) molecular sieve membranes is by coating a layer of polymer-bound $AlPO_4$ molecular sieve crystals on a porous membrane support in accordance with the following steps: Providing a porous membrane support having an average pore size of 0.1 µm or greater than 0.1 µm; providing template-free $AlPO_4$ molecular sieve crystal particles synthesized by a hydrothermal synthesis method; forming a slurry by dispersing the template-free $AlPO_4$ molecular sieve crystal particles in one solvent or a mixture of two or more solvents by ultrasonic mixing, mechanical stirring or a both ultrasonic mixing and mechanical stirring; dissolving one or more types polymers as a binder of the $AlPO_4$ molecular sieve particles in the slurry to form a stable polymer-bound $AlPO_4$ molecular sieve suspension; coating at least one surface of the porous membrane support with the stable polymer-bound $AlPO_4$ molecular sieve suspension; drying the polymer-bound $AlPO_4$ molecular sieve coating on the porous membrane support by heating to form high selectivity microporous $AlPO_4$ molecular sieve membrane. In some cases, a membrane post-treatment step can be added to improve selectivity but not change or damage the membrane, or cause the membrane to lose performance with time. The membrane post-treatment step can involve coating the top surface of the microporous $AlPO_4$ molecular sieve membrane with a thin layer of material such as a polysiloxane, a fluoro-polymer, a thermally curable silicone rubber, a high permeability microporous polymer, a high permeability polybenzoxazole polymer, or a UV radiation curable epoxy silicone.

A third method for preparing a high selectivity microporous aluminophosphate ($AlPO_4$) molecular sieve membrane by seeding including in-situ crystallization of a continuous second layer of $AlPO_4$ molecular sieve crystals on a seed layer of $AlPO_4$ molecular sieve crystals supported on a porous membrane support comprising the steps of: Providing a porous membrane support having an average pore size of 0.1 µm or greater than 0.1 µm; providing template-containing $AlPO_4$ molecular sieve seeds with an average particle size of ~50 nm to 1 µm synthesized by a hydrothermal synthesis method or a microwave assisted hydrothermal synthesis method; dispersing the template-containing $AlPO_4$ molecular sieve seed particles in a solvent to prepare a colloidal solution of the $AlPO_4$ molecular sieve seed particles; coating a layer of the colloidal solution of the template-containing $AlPO_4$ molecular sieve seeds on at least one surface of the porous membrane support by immersing the porous membrane support in the colloidal solution of the $AlPO_4$ molecular sieve seed particles; drying the colloidal solution layer of the template-containing $AlPO_4$ molecular sieve seeds on the surface of the porous membrane support to form a seed layer of $AlPO_4$ molecular sieve crystals on the porous membrane support; synthesizing an aqueous $AlPO_4$-forming gel comprising an organic structure-directing template or a mixture of two or more organic structure-directing templates; aging the $AlPO_4$-forming gel to form an aged $AlPO_4$-forming gel; contacting the surface of the seed layer of $AlPO_4$ molecular sieve crystals supported on a porous membrane support with the aged $AlPO_4$-forming gel; heating the seeded porous membrane support and the aged $AlPO_4$-forming gel to form a continuous second layer of $AlPO_4$ molecular sieve crystals on the seed layer of $AlPO_4$ molecular sieve crystals supported on the porous membrane support; and calcining the resulting template-containing dual layer $AlPO_4$ molecular sieve membrane to remove the organic structure-directing template and form a dual layer template-free microporous $AlPO_4$ molecular sieve crystals on the porous membrane support. In some cases to further improve selectivity but not change or damage the membrane, or cause the membrane to lose performance with time, multiple layers of template-free microporous $AlPO_4$ molecular sieve crystals are formed on the porous membrane support by contacting the surface of the second layer of $AlPO_4$ molecular sieve crystals on the seed layer of $AlPO_4$ molecular sieve crystals supported on the porous membrane support with the aged $AlPO_4$-forming gel again followed by heating and repeating the contact and heating steps as desired.

The methods of the current invention for producing defect free high selectivity microporous $AlPO_4$ molecular sieve membranes are suitable for large scale membrane production. The microporous $AlPO_4$ molecular sieve used for the preparation of the microporous $AlPO_4$ molecular sieve membrane in this invention has selectivity significantly higher than any polymer membranes for separations of gases. The microporous $AlPO_4$ molecular sieve used for the preparation of the microporous AlPO$_4$ molecular sieve membrane in the current invention is selected from the group consisting of AlPO-18, AlPO-14, AlPO-52, AlPO-53, AlPO-5, AlPO-34, AlPO-31, AlPO-17, AlPO-11, AlPO-41, AlPO-25, AlPO-21, AlPO-22, and mixtures thereof. The template-free AlPO$_4$ molecular sieves are present in a volume ratio to the polymer that is used as a binder of from about 70:30 to 99:1.

The polymer that serves as a binder of the AlPO$_4$ molecular sieve particles is a glassy polymer such as a polyimide, polyethersulfone, polybenzoxazole, microporous polymer, or a mixture thereof. Usually, one or two types of polymers are used.

The microporous AlPO$_4$ molecular sieve membranes in the form of a disk, tube, or hollow fiber fabricated by the methods described in the current invention have superior thermal and chemical stability, good erosion resistance, high $CO_2$ plasticization resistance, and significantly improved selectivity over polymer membranes for gas and liquid separations, including carbon dioxide/methane ($CO_2/CH_4$), carbon dioxide/nitrogen ($CO_2/N_2$), and hydrogen/methane ($H_2/CH_4$) separations.

The invention provides a process for separating at least one gas or liquid from a mixture of gases or liquids using the microporous AlPO$_4$ molecular sieve membranes described herein. This process for separating gases or liquids comprises: Providing a microporous AlPO$_4$ molecular sieve membrane which is permeable to said at least one gas or liquid; contacting the mixture on one side of the microporous AlPO$_4$ molecular sieve membrane to cause said at least one gas or liquid to permeate the microporous AlPO$_4$ molecular sieve membrane; and removing from the opposite side of the membrane a permeate gas or liquid composition comprising a portion of said at least one gas or liquid which permeated said membrane.

The microporous AlPO$_4$ molecular sieve membranes of the present invention are useful for liquid separations such as deep desulfurization of gasoline and diesel fuels, ethanol/water separations, and pervaporation dehydration of aqueous/organic mixtures, as well as for a variety of gas and vapor separations such as $CO_2/CH_4$, $CO_2/N_2$, $H_2/CH_4$, $O_2/N_2$, olefin/paraffin such as propylene/propane, iso/normal paraffins, polar molecules such as $H_2O$, $H_2S$, and $NH_3$/mixtures with $CH_4$, $N_2$, $H_2$, and other light gases separations.

EXAMPLES

The following examples are provided to illustrate one or more preferred embodiments of the invention, but are not limited embodiments thereof. Numerous variations can be made to the following examples that lie within the scope of the invention.

Example 1

A "control" poly(3,3',4,4'-diphenylsulfone tetracarboxylic dianhydride-3,3',5,5'-tetramethyl-4,4'-methylene dianiline) (poly(DSDA-TMMDA)) polymer membrane was prepared as a comparative example 6.0 g of poly(DSDA-TMMDA) polyimide polymer was dissolved in a solvent mixture of 14.0 g of N-methylpyrrolidone (NMP) and 20.6 g of 1,3-dioxolane by mechanical stirring for 3 hours to form a homogeneous casting dope. The resulting homogeneous casting dope was allowed to degas overnight. A "control" poly(DSDA-TMMDA)-PES polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was detached from the glass plate and dried at 200° C. under vacuum for at least 48 hours to completely remove the residual solvents to form the "control" poly(DSDA-TMMDA) polymer membrane (abbreviated as poly(DSDA-TMMDA) membrane in Tables 1 and 2).

Example 2

An AlPO-14 microporous molecular sieve membrane was prepared. An AlPO-14 microporous molecular sieve membrane containing polymers as the binder for AlPO-14 particles was prepared as follows: 4.2 g of calcined template-free AlPO-14 molecular sieves were dispersed in a mixture of 15.0 g of NMP and 22.2 g of 1,3-dioxolane by mechanical stirring and ultrasonication for 1 hour to form a slurry. Then 1.4 g of PES was added to functionalize AlPO-14 molecular sieves in the slurry. The slurry was stirred for at least 1 hour to completely dissolve PES polymer and functionalize the surface of AlPO-14. After that, 4.6 g of poly(DSDA-TMMDA) polyimide polymer was added to the slurry and the resulting mixture was stirred for another 3 hours to form a stable coating dope containing 70 wt-% of dispersed AlPO-14 molecular sieves (weight ratio of AlPO-14 to poly(DSDA-TMMDA) and PES is 70:100). The stable coating dope was allowed to degas overnight.

An AlPO-14 molecular sieve membrane was prepared by casting the bubble free coating dope on a clean glass plate using a doctor knife with a 30-mil gap. The film together with the glass plate was then put into a vacuum oven. The solvents were removed by slowly increasing the vacuum and the temperature of the vacuum oven. Finally, the membrane was detached from the glass plate and was dried at 200° C. under vacuum for at least 48 hours to completely remove the residual solvents to form AlPO-14 molecular sieve membrane (abbreviated as AlPO-14 membrane in Tables 1 and 2).

Example 3

An AlPO-18 microporous molecular sieve membrane was prepared by a coating method. An AlPO-18 microporous molecular sieve membrane containing polymers as the binder for AlPO-18 particles was prepared as follows: 4.2 g of AlPO-18 molecular sieves were dispersed in a mixture of 15.0 g of NMP and 22.2 g of 1,3-dioxolane by mechanical stirring and ultrasonication for 1 hour to form a slurry. Then 1.4 g of PES was added to functionalize AlPO-18 molecular sieves in the slurry. The slurry was stirred for at least 1 hour to completely dissolve PES polymer and functionalize the surface of AlPO-18. After that, 4.6 g of poly(DSDA-TMMDA) polyimide polymer was added to the slurry and the resulting mixture was stirred for another 3 hours to form a stable coating dope containing 70 wt-% of dispersed AlPO-18 molecular sieves (weight ratio of AlPO-18 to poly(DSDA-TMMDA) and PES is 70:100). The stable coating dope was allowed to degas overnight.

An AlPO-18 molecular sieve membrane was prepared on a non-woven fabric porous membrane support by coating the bubble free coating dope using a doctor knife with a 10-mil gap. The film together with the fabric substrate was then put into a vacuum oven. The solvents were removed by slowly increasing the vacuum and the temperature of the vacuum oven. Finally, the membrane was dried at 200° C. under vacuum for at least 48 hours to completely remove the residual solvents to form AlPO-18 molecular sieve membrane (abbreviated as AlPO-18 membrane).

Example 4

An AlPO-18 microporous molecular sieve membrane was prepared on a porous stainless steel tube by an in-situ crystallization method. An AlPO-18 microporous molecular sieve membrane was synthesized by in-situ crystallization on a porous stainless steel tube (0.8 μm pores, Pall Corporation, USA). Before the synthesis of AlPO-18 microporous molecular sieve membrane, the porous stainless steel tube was boiled in purified water for 3 hours and dried at 100° C. under vacuum for 30 minutes.

A clear aqueous AlPO-18-forming solution comprising an organic structure-directing template, tetraethylammonium hydroxide (TEAOH), with molar composition of 6.32TEAOH:1.0Al$_2$O$_3$:3.16P$_2$O$_5$:186H$_2$O was synthesized by mixing aluminum isopropoxide (Aldrich), TEAOH (35 wt-%, Aldrich) and water under vigorous stirring for 1 hour. Then phosphoric acid (85 wt-%, Aldrich) was added very slowly in a drop-wise fashion. The resulting mixture was stirred for 2 hours at ambient temperature in order to obtain a clear aluminophosphate AlPO-18-forming solution. The clear solution was filtered with a 450 nm PTFE filer.

The stainless steel tube with its outside wrapped in Teflon® tape was directly placed vertically in a Teflon® tube in an autoclave. The Teflon® tube was then filled with the clear aqueous AlPO-18-forming solution to cover the end of the stainless steel tube. Typically, the solution level was approximately 10 mm above the upper end of the stainless tube. Hydrothermal synthesis was carried out for about 20 hours at 150° C. After synthesis, the membrane was washed with purified water at 24° C. and dried at 100° C. in an oven for about 10 minutes. A second synthesis layer was applied using the same procedure, but the tube was inverted to obtain a more uniform layer and a second AlPO-18-forming gel with different aluminum and phosphorous composition was used. The second AlPO-18-forming gel with a molar composition of 1.0 TEAOH:1.0Al$_2$O$_3$:1.0P$_2$O$_5$:40H$_2$O was synthesized by mixing Versal 250 (aluminum source) and water for 0.5 hour first, then adding phosphoric acid (85 wt-%, Aldrich) slowly under stirring and stirring for 1 hour. Finally, TEAOH (35 wt-%, Aldrich) was added very slowly in a drop-wise fashion and the resulting mixture was stirred for at least 24 hours at ambient temperature to age the AlPO-18-forming gel. The third and fourth synthesis layers (if needed) were prepared using the same procedure as the second layer. The membrane was calcined in air at 390° C. for 10 hours to remove the TEAOH template from the AlPO-18 framework. The heating and cooling rates were 0.6 and 0.9° C. min$^{-1}$, respectively.

Example 5

An AlPO-18 microporous molecular sieve membrane was prepared on a porous ceramic disk by an in-situ crystallization method. An AlPO-18 microporous molecular sieve membrane was synthesized by in-situ crystallization on a porous inorganic ceramic membrane disk (0.18 μm pores, cat. no.: MF disc 180 nm dia 39 T2.0 G, ECO Ceramics B.V., The Netherlands). Before the synthesis of AlPO-18 microporous molecular sieve membrane, the porous inorganic ceramic membrane disk was boiled in purified water for 3 hours and dried at 100° C. under vacuum for 30 minutes.

A clear aqueous AlPO-18-forming solution comprising an organic structure-directing template, tetraethylammonium hydroxide (TEAOH), with molar composition of 6.32TEAOH:1.0Al$_2$O$_3$:3.16P$_2$O$_5$:186H$_2$O was synthesized by mixing aluminum isopropoxide (Aldrich), TEAOH (35 wt-%, Aldrich) and water under vigorous stirring for 1 hour. Then phosphoric acid (85 wt-%, Aldrich) was added very slowly in a drop-wise fashion. The resulting mixture was stirred for 2 hours at ambient temperature in order to obtain a clear aluminophosphate AlPO-18-forming solution. The clear solution was filtered with a 450 nm PTFE filer.

The porous inorganic ceramic membrane disk was placed vertically in a Teflon tube in an autoclave. The Teflon® tube was then filled with the clear aqueous AlPO-18-forming solution to cover the top edge of the disk. Hydrothermal synthesis was carried out for about 20 hours at 150° C. After synthesis, the membrane was washed with purified water at 24° C. and dried at 100° K in an oven for about 10 minutes. A second synthesis layer was applied using the same procedure, but the disk was inverted to obtain a more uniform layer and a second AlPO-18-forming gel with different aluminum and phosphorus composition was used. The second AlPO-18-forming gel with a molar composition of 1.0 TEAOH:1.0Al$_2$O$_3$:1.0P$_2$O$_5$:40H$_2$O was synthesized by mixing Versal 250 (aluminum source) and water for 0.5 hour first, then adding phosphoric acid (85 wt-%, Aldrich) slowly under stirring and stirring for 1 hour. Finally, TEAOH (35 wt-%, Aldrich) was added very slowly in a drop-wise fashion and the resulting mixture was stirred for at least 24 hours at ambient temperature to age the AlPO-18-forming gel. The third and fourth synthesis layers (if needed) were prepared using the same procedure as the second layer. The membrane was calcined in air at 390° C. for 10 hours to remove the TEAOH template from the AlPO-18 framework. The heating and cooling rates were 0.6 and 0.9° C. min$^{-1}$, respectively.

Example 6

An AlPO-18 microporous molecular sieve membrane was prepared on a porous ceramic disk by a seeding method. An AlPO-18 microporous molecular sieve membrane was synthesized by in-situ crystallization on a porous inorganic ceramic membrane disk (0.18 μm pores, cat. no.: MF disc 180 nm dia 39 T2.0 G, ECO Ceramics B.V., The Netherlands). Before the synthesis of AlPO-18 microporous molecular sieve membrane, the porous inorganic ceramic membrane disk was boiled in purified water for 3 hours and dried at 100° C. under vacuum for 30 minutes.

A clear aqueous AlPO-18-forming solution comprising an organic structure-directing template, tetraethylammonium hydroxide (TEAOH), with molar composition of 6.32TEAOH:1.0Al$_2$O$_3$:3.16P$_2$O$_5$:186H$_2$O was synthesized by mixing aluminum isopropoxide (Aldrich), TEAOH (35 wt-%, Aldrich) and water under vigorous stirring for 1 hour. Then phosphoric acid (85 wt-%, Aldrich) was added very slowly in a drop-wise fashion. The resulting mixture was stirred for 2 hours at ambient temperature in order to obtain a clear aluminophosphate AlPO-18-forming solution. The clear solution was filtered with a 450 nm PTFE filer. The hydrothermal synthesis was carried out in a Teflon-lined autoclave at 150° C. for 20 hours. After the synthesis, the suspension containing nanosized AlPO-18 crystals was purified in a series of three steps consisting of high-speed centrifugation, removal of the mother liquor and re-dispersion in water using an ultrasonic bath.

The nanosized AlPO-18 crystals were re-dispersed in ethanol to obtain a concentration of the solid product of about 3 wt-% and used for the preparation of seed layer on the porous inorganic ceramic membrane disk (0.18 μm pores, cat. no.: MF disc 180 nm dia 39 T2.0 G, ECO Ceramics B.V., The Netherlands) via a spin coating or dip coating method. The uniform seeded porous inorganic ceramic membrane disk was placed vertically in a Teflon® tube in an autoclave. The Teflon tube was then filled with an aged AlPO-18-forming gel to cover the top edge of the disk. Hydrothermal synthesis was carried out for about 20 hours at 150° C. The aged AlPO-18-forming gel with a molar composition of 1.0 TEAOH: $1.0Al_2O_3:1.0P_2O_5:40H_2O$ was synthesized by mixing Versal 250 (aluminum source) and water for 0.5 hour first, then adding phosphoric acid (85 wt-%, Aldrich) slowly under stirring and stirring for 1 hour. Finally, TEAOH (35 wt-%, Aldrich) was added very slowly in a drop-wise fashion and the resulting mixture was stirred for at least 24 hours at ambient temperature to age the AlPO-18-forming gel. After the membrane was heated at 150° C., the membrane with a first layer of template-containing AlPO-18 crystals on the surface of the uniform seeded porous inorganic ceramic membrane disk was washed with purified water at 24° C. and dried at 100° C. in an oven for about 10 minutes. A second synthesis layer was applied using the same procedure, but the disk was inverted to obtain a more uniform layer. The third and fourth synthesis layers (if needed) were prepared using the same procedure as the first and second layers. The membrane was calcined in air at 390° C. for 10 hours to remove the TEAOH template from the AlPO-18 framework. The heating and cooling rates were 0.6 and 0.9° C. min$^{-1}$, respectively.

Example 7

An AlPO-5 molecular sieve membrane was prepared on a porous a-alumina tube by a seeding method. A porous a-alumina tube membrane (1.2 μm pores, Pall Corporation, USA) was used as a membrane support. Both ends of the substrate were glazed to expose 2 cm in the middle portion, which was seeded as follows: First, template-containing nanosized AlPO-5 particles were synthesized. A suspension with the following chemical composition $1Al_2O_3:1.5P_2O_5:2TEAOH:80H_2O$ was hydrothermally (HT) treated under stirred condition at 150° C. for 20 hours. Aluminum isopropoxide (Aldrich), tetraethylammonium hydroxide (TEAOH, 35 wt-%, Aldrich) and DI water were mixed under 1000 rpm vigorous stirring for 1 hour and then the phosphoric acid (85 wt-%, Aldrich) was added very slowly in a drop-wise fashion in order to avoid the suspension to form dense gels. The resulted milky suspension mixture was stirred for 0.5 hour prior to transferring to a 0.6 L stirred reactor. The reactor was ramped over 4 hours to 150° C. and held at 150° C. for 20 hours under 250 rpm stirring. After the HT treatment, the resulted milky suspensions containing nanosized AlPO-5 crystals were purified by centrifugation in a series of three steps (10,000 rpm for 40 minutes) and thoroughly redispersed in water using an ultrasonic bath containing ice.

A pre-cleaned membrane support was immersed into this AlPO-5 suspension. The AlPO-5 suspension was slowly drawn out using a peristaltic pump so that the AlPO-5 seed particles attach to the support by electrostatic attraction and surface adhesion. The membrane support coated with AlPO-5 seeds was dried at ambient conditions and was secondary grown to form AlPO-5 membrane by HT synthesis using a precursor solution of molar composition $1Al_2O_3:1.5P_2O_5:2TEAOH:80H_2O$. The mother liquor was prepared by dissolving aluminum isopropoxide (Aldrich) and TEAOH (35 wt-%, Aldrich) in DI water and mixing it with phosphoric acid (85 wt-%, Aldrich) under vigorous stirring at room temperature by adding phosphoric acid very slowly in a drop-wise fashion in order to avoid the suspension to form dense gels. The suspension was transferred to a Teflon-lined stainless steel autoclave and the dip-coated support membrane was introduced vertically. The autoclave was then heated in an air-oven at 150° C. for 20 hours. After the synthesis, the autoclave was cooled down to room temperature and the substrate was washed thoroughly with water, dried at 50° C. and tested for defects using permeation measurements. More AlPO-5 crystal layers were prepared using the same procedure as the second layer if the membrane with two AlPO-5 layers still has defects. The final AlPO-5 membrane was calcined at 550° C. (heating rate of 0.5° C./min) for 6 hours to remove the TEAOH templates occluded in the molecular sieve pores during synthesis.

Example 8

An AlPO-14 microporous molecular sieve membrane was prepared on a porous ceramic disk by an in-situ crystallization method. An AlPO-14 microporous molecular sieve membrane was synthesized by in-situ crystallization on a porous inorganic ceramic membrane disk (0.18 μm pores, cat. no.: MF disc 180 nm dia 39 T2.0 G, ECO Ceramics B.V., The Netherlands). Before the synthesis of AlPO-14 microporous molecular sieve membrane, the porous inorganic ceramic membrane disk was boiled in purified water for 3 hours and dried at 100° C. under vacuum for 30 minutes.

An AlPO-14-forming synthesis gel comprising organic structure-directing templates, isopropylamine (iPrNH$_2$, Aldrich) and tetrabutylammonium hydroxide (TBAOH, 40 wt-% in water, Aldrich), with molar composition of 0.25 iPrNH$_2$: 0.75 TBAOH:$1.0Al_2O_3:1.0P_2O_5:40H_2O$ was synthesized by mixing Versal 251 (aluminum source) in H$_2$O first, Then phosphoric acid (85 wt-%, Aldrich) was added very slowly in a drop-wise fashion under stirring. After that, a mixture of iPrNH$_2$ and TBAOH templates was added very slowly in a drop-wise fashion under stirring. The resulting mixture was stirred for at least 24 hours at room temperature to obtain an aged AlPO-14-forming gel.

The porous inorganic ceramic membrane disk was placed vertically in a Teflon tube in an autoclave. The Teflon® tube was then filled with the aged AlPO-14-forming gel to cover the top edge of the disk. Hydrothermal synthesis was carried out for about 30 hours at 175° C. After synthesis, the membrane was washed with purified water at 24° C. and dried at 100° C. in an oven for about 10 minutes. A second synthesis layer was applied using the same procedure, but the disk was inverted to obtain a more uniform layer. The third and fourth synthesis layers (if needed) were prepared using the same procedure as the first and second layers. The membrane was calcined in air at 600° C. for 10 hours to remove the organic templates from the AlPO-14 framework. The heating and cooling rates were 0.6 and 0.9° C. min$^{-1}$, respectively.

Example 9

The $CO_2/CH_4$ separation properties of "Control" poly(DSDA-TMMDA) polymer membrane prepared in Example 1 and AlPO-14 membrane prepared in Example 2 were determined. The permeabilities ($P_{CO2}$ and $P_{CH4}$) and selectivity ($\alpha_{CO2/CH4}$) of the "control" poly(DSDA-TMMDA) polymer membrane and AlPO-14 membrane containing poly(DSDA-TMMDA) and PES polymer binders were measured by pure gas measurements at 50° C. under about 690 kPa (100 psig) pressure. The results for $CO_2/CH_4$ separation are shown in Table 1.

It can be seen from Table 1 that the AlPO-14 membrane showed significantly improved selectivity and permeability over poly(DSDA-TMMDA) polymer membrane for $CO_2/$ $CH_4$ separation. The AlPO-14 membrane ($\alpha_{CO2/CH4}$=47.3 and $P_{CO2}$=52.0 barrers) showed simultaneous $\alpha_{CO2/CH4}$ increase by 76% and $P_{CO2}$ increase by 117% compared to the "control" poly(DSDA-TMMDA) membrane ($\alpha_{CO2/CH4}$= 24.0 and $P_{CO2}$=26.9 barrers) for $CO_2/CH_4$ separation. These results demonstrate that the AlPO-14 molecular sieves in AlPO-14 membrane possessing micropores that are smaller or similar in size to $CH_4$ but larger than $CO_2$ have high $CO_2/CH_4$ selectivity due to a molecular sieving mechanism.

AlPO-14 membrane of the present invention showed significantly enhanced $CO_2/CH_4$ separation performance that far exceeded theoretical upper bounds for $CO_2/CH_4$ separation. These results indicate that the novel voids and defects free AlPO-14 membrane of the present invention is a very promising membrane candidates for the removal of $CO_2$ from natural gas or flue gas. The improved performance of AlPO-14 membrane over the "control" poly(DSDA-TMMDA) polymer membrane is attributed to the molecular sieving mechanism of AlPO-14 molecular sieves.

TABLE 1

Pure gas permeation test results of "Control" poly(DSDA-TMMDA) polymer membrane and AlPO-14 membrane for $CO_2/CH_4$ separation [a]

| Membrane | $P_{CO2}$ (Barrer) | $\Delta P_{CO2}$ (Barrer) | $\alpha_{CO2/CH4}$ | $\Delta\alpha_{CO2/CH4}$ |
|---|---|---|---|---|
| Poly(DSDA-TMMDA) membrane from Example 1 | 24.0 | 0 | 26.9 | 0 |
| AlPO-14 membrane from Example 2 | 52.0 | 117% | 47.3 | 76% |

[a] Tested at 50° C. under 690 kPa (100 psig) pure gas pressure.

Example 10

The $H_2/CH_4$ separation properties of "Control" poly (DSDA-TMMDA) polymer membrane prepared in Example 1 and AlPO-14 membrane prepared in Example 2 were determined. The permeabilities ($P_{H_2}$ and $P_{CH_4}$) and selectivity ($\alpha_{H_2/CH_4}$) of the "control" poly(DSDA-TMMDA) polymer membrane and AlPO-14 membrane were measured by pure gas measurements at 50° C. under about 690 kPa (100 psig) pressure using a dense film test unit. The results for $H_2/CH_4$ separation are shown in Table 2.

It can be seen from Table 2 that the AlPO-14 membrane showed significantly improved selectivity and permeability over poly(DSDA-TMMDA) polymer membrane for $H_2/CH_4$ separation. The AlPO-14 membrane ($\alpha_{H2/CH4}$=133.2 and $P_{H2}$=146.5 barrers) showed simultaneous $\alpha_{H2/CH4}$ increase by ~90% and $P_{H2}$ increase by 135% compared to the "control" poly(DSDA-TMMDA) membrane ($\alpha_{H2/CH4}$=69.8 and $P_{H2}$=62.3 barrers) for $H_2/CH_4$ separation. These results demonstrate that the AlPO-14 molecular sieves in AlPO-14 membrane possessing micropores that are smaller or similar in size to $CH_4$ but much larger than $H_2$ have high $H_2/CH_4$ selectivity due to a molecular sieving mechanism.

The $H_2/CH_4$ separation performance of the "control" poly (DSDA-TMMDA) polymer membrane is far below Robeson's 1991 polymer upper bound for $H_2/CH_4$ separation. AlPO-14 membrane of the present invention showed significantly enhanced $H_2/CH_4$ separation performance that far exceeded Robeson's 1991 polymer upper bound for $H_2/CH_4$ separation. These results indicate that the novel voids and defects free AlPO-14 membrane of the present invention is a very promising membrane candidates for the removal of $H_2$ from natural gas or syngas (a gas mixture of $CO_2$, CO, $H_2$, $H_2S$, and COS). The improved performance of AlPO-14 membrane over the "control" poly(DSDA-TMMDA) polymer membrane is attributed to the molecular sieving mechanism of AlPO-14 molecular sieves.

TABLE 2

Pure gas permeation test results of "Control" poly(DSDA-TMMDA) polymer membrane and AlPO-14 membrane for $H_2/CH_4$ separation [a]

| Membrane | $P_{H2}$ (Barrer) | $\Delta P_{H2}$ (Barrer) | $\alpha_{H2/CH4}$ | $\Delta\alpha_{H2/CH4}$ |
|---|---|---|---|---|
| Poly(DSDA-TMMDA) membrane from Example 1 | 62.3 | 0 | 69.8 | 0 |
| AlPO-14 membrane from Example 2 | 146.5 | 135% | 133.2 | 91% |

[a] Tested at 50° C. under 690 kPa (100 psig) pure gas pressure.

The invention claimed is:

1. A method of making a microporous crystalline aluminophosphate ($AlPO_4$) molecular sieve membrane, comprising the steps of:
   a) providing a porous membrane support having an average pore size of 0.1 μm or greater than 0.1 μm;
   b) providing template-free $AlPO_4$ molecular sieve crystal particles synthesized by a hydrothermal synthesis method;
   c) dispersing the template-free $AlPO_4$ molecular sieve crystal particles in at least one solvent to form a slurry;
   d) dissolving one or two types of polymers as a binder of the template-free $AlPO_4$ molecular sieve particles in the slurry to form a stable polymer-bound $AlPO_4$ molecular sieve suspension wherein said template-free $AlPO_4$ molecular sieve particles to said one or two types of polymers are present at a volume ratio of about 70:30 to 99:1;
   e) coating at least one surface of the porous membrane support with the stable polymer-bound $AlPO_4$ molecular sieve suspension; and
   f) drying the coated porous membrane support by applying heat to form a microporous $AlPO_4$ molecular sieve membrane.

2. The method of claim 1 further comprising after said step f), adding a protective layer to said microporous $AlPO_4$ molecular sieve membrane wherein said protective layer comprises a polysiloxane, a fluoro-polymer, a thermally curable silicone rubber, a high permeability microporous polymer, a high permeability polybenzoxazole polymer, or a UV radiation curable epoxy silicone.

3. A membrane comprising a layer of template-free $AlPO_4$ molecular sieves as the continuous phase and a glassy polymer dispersed therein as a binder for said template-free $AlPO_4$ molecular sieves on a porous membrane support, wherein said template-free $AlPO_4$ molecular sieves to said polymers are present at a volume ratio of about 70:30 to 99:1.

4. The membrane of claim 3 wherein said $AlPO_4$ molecular sieves are selected from the group consisting of AlPO-18, AlPO-14, AlPO-52, AlPO-53, AlPO-5, AlPO-34, AlPO-31, AlPO-17, AlPO-11, AlPO-41, AlPO-25, AlPO-21, AlPO-22, and mixtures thereof.

5. The membrane of claim 3 wherein said $AlPO_4$ molecular sieve is AlPO-14 or AlPO-18.

6. The membrane of claim 3 wherein said glassy polymer comprises polyimide, polybenzoxazole, microporous polymer, polyethersulfone or a mixture thereof.

* * * * *